(12) United States Patent
Jindal et al.

(10) Patent No.: US 11,782,955 B1
(45) Date of Patent: Oct. 10, 2023

(54) MULTI-STAGE CLUSTERING

(71) Applicant: Amazon Technologies, Inc., Seattle, WA (US)

(72) Inventors: Deepika Jindal, Kent, WA (US); Igor Grudetskyi, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 44 days.

(21) Appl. No.: 17/458,184

(22) Filed: Aug. 26, 2021

(51) Int. Cl.
G06F 16/28 (2019.01)
G06N 20/00 (2019.01)

(52) U.S. Cl.
CPC .......... G06F 16/285 (2019.01); G06N 20/00 (2019.01)

(58) Field of Classification Search
CPC ............................. G06F 16/285; G06N 20/00
See application file for complete search history.

(56) References Cited

U.S. PATENT DOCUMENTS

| | | | | |
|---|---|---|---|---|
| 2005/0234973 A1* | 10/2005 | Zeng | .................. | G06N 5/02 |
| 2005/0283784 A1* | 12/2005 | Suzuki | .................. | G06F 9/5044 |
| | | | | 718/100 |
| 2009/0228445 A1* | 9/2009 | Gangal | .................. | G06F 16/2465 |
| | | | | 707/E17.05 |
| 2015/0261846 A1* | 9/2015 | Hall | .................. | G06F 16/285 |
| | | | | 707/738 |
| 2016/0379132 A1* | 12/2016 | Jin | .................. | H04L 67/535 |
| | | | | 706/12 |
| 2020/0034752 A1* | 1/2020 | Luo | .................. | G06N 20/00 |
| 2022/0050884 A1* | 2/2022 | Sahu | .................. | G06N 5/022 |

OTHER PUBLICATIONS

Seema Singh, "Sampling Techniques", Towards Data Science, https://towardsdatascience.com/sampling-techniques-a4e34111d808 (Year: 2018).*

* cited by examiner

Primary Examiner — Mark D Featherstone
Assistant Examiner — Brooks T Hale
(74) Attorney, Agent, or Firm — K&L Gates LLP

(57) ABSTRACT

Systems and techniques are generally described for multi-stage text-based clustering. In various examples, a first data set comprising a first set of elements may be received. Each element of the first set of elements may include text data. A clustering algorithm may be used to determine a first set of clusters of the first set of elements based at least in part on similarities in the text data. A second set of clusters, for each cluster of the first set of clusters, may be determined using the clustering algorithm. A number of resources for labeling the first set of elements may be determined based at least in part on the first set of clusters. The number of resources may be assigned to label clusters of the second set of clusters based at least in part on a number of elements in each cluster of the second set of clusters.

20 Claims, 6 Drawing Sheets

MULTI-STAGE CLUSTERING

BACKGROUND

Clustering is an unsupervised machine learning technique that can be used to find patterns in data. Clustering techniques identify and group similar data points in larger data sets without concern for the specific outcome. The goal of a clustering algorithm is to group data points together into "clusters" based on similarity so that the clusters can be more easily understood and/or manipulated to gain insight into the data.

DETAILED DESCRIPTION

Figure 1:
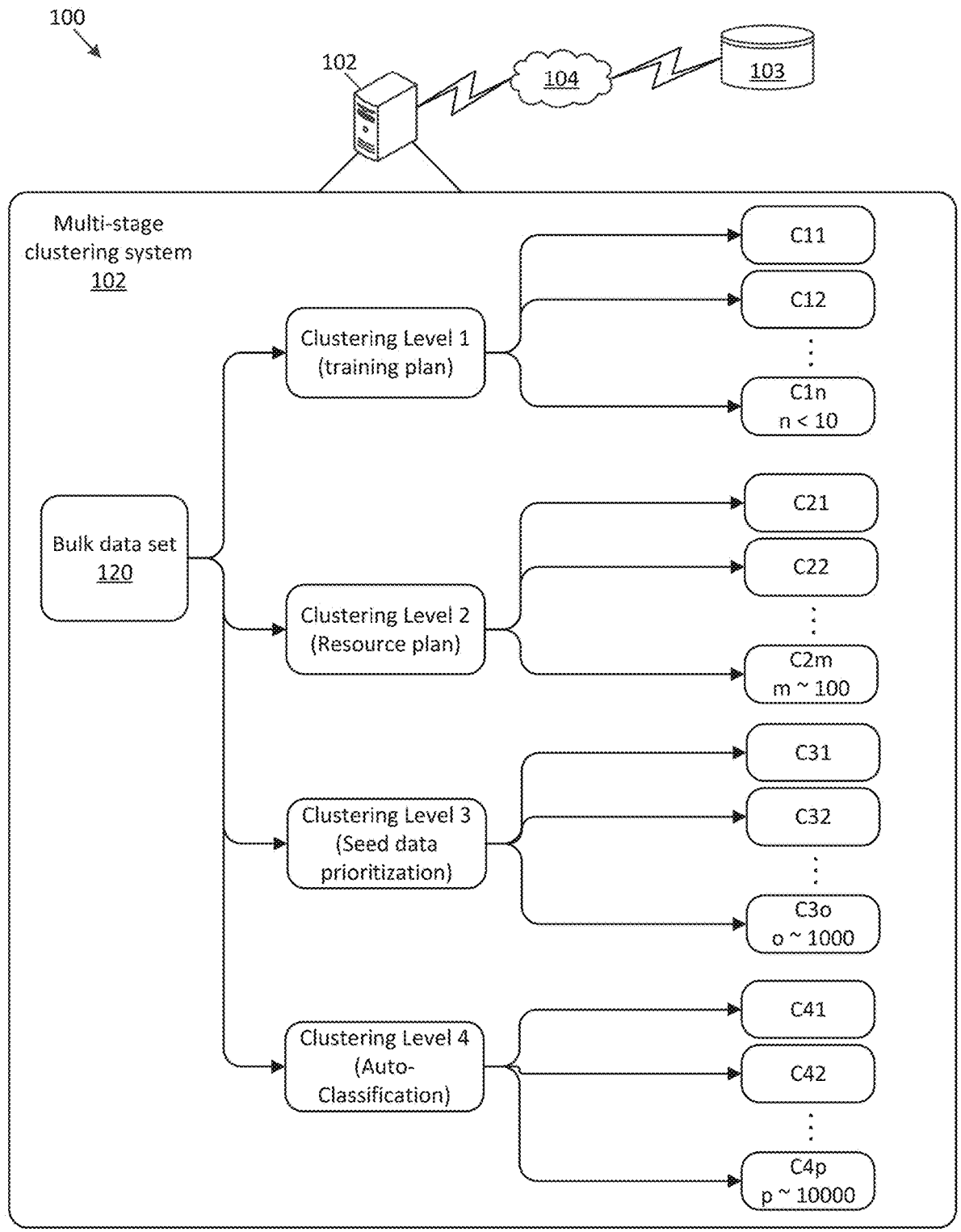
FIG. 1 is a block diagram depicting an example system effective to perform multi-stage text-based clustering, according to various embodiments of the present disclosure.

In the following description, reference is made to the accompanying drawings that illustrate several examples of the technology described herein. It is understood that other examples may be utilized and various operational changes may be made without departing from the scope of the present disclosure. The following detailed description is not to be taken in a limiting sense, and the scope of the embodiments described herein is defined only by the claims of the issued patent.

Evaluating large data sets according to compliance rules, regulations, and/or policies can be challenging since the data may not be uniform in terms of organization, syntax, structure, and/or categorization. Additionally, the compliance rules and/or regulations may change over time resulting in compliance labeling challenges. Labeling large data sets according to compliance rules and/or regulations may be resource intensive (e.g., in terms of compute resources and/or reviewers) and it may be difficult to forecast the resources required for a given compliance labeling task. Additionally, although supervised classification algorithms exist that may be useful in compliance labeling, such algorithms typically involve large amounts of human-labeled data.

Described herein are systems and techniques for multi-stage clustering of large data sets of elements on the basis of the element features (e.g., using the similarity of an element's set of features with respect to other elements). Such multi-stage clustering techniques may be used to reduce manual effort of labeling/annotating data for compliance and/or other purposes. In various examples, a series of unsupervised learning models may be used to create clusters of elements of various sizes based on similarities in text data associated with the elements. In each cluster, another clustering algorithm may be applied in order to generate more granular clusters. This exercise is iterative in nature, as it deals with multiple attributes for clustering.

In an example, the multi-stage clustering techniques may be used to cluster items sold using an e-commerce service to determine whether the products are compliant with one or more rules or regulations. In a simplistic example, each clustering operation may generate 10 clusters of items. The iterative clustering may be completed when a desired cluster size (e.g., an average of 5-10 items in each cluster) is reached. This is merely an example and the cluster sized used may be a tunable parameter that is implementation dependent.

Clustering is a type of unsupervised machine learning technique used for finding patterns in data. Topic modeling is one of the common tasks for textual clustering, wherein a corpus of text (sometimes referred to as "documents") are separated into a desired number of topics. Clustering techniques are sometimes used to obtain holistic insights from the data. Described herein is a multistage clustering technique for optimized and low resource classification (e.g., for an item compliance task). For example, the techniques may iteratively use topic modeling (and/or other clustering techniques) for specialized review training (e.g., training to label particular types of items with label data according to compliance rules) and reducing switching cost (e.g., switching from one reviewer to another). For example, a cluster of mold prevention claims for an EPA classification problem would have more resources on anti-mold devices and may be delegated to a different set of reviewers relative to pesticide devices. For example, all items with claims related to mold may be reviewed back-to-back before transitioning to review of bacterial claims. If an intra-cluster weighted similarity score is not at an acceptable value, the cluster may be broken to identify a closer-knit cluster.

A second level of clustering (e.g., forming level 2 clusters for each of the level 1 clusters) may be used to prioritize the review for a skip review mechanism. Most classification problems deal with a significant amount of data that needs reviewing. Although there are multiple supervised classification algorithms, these typically involve sizable manually-reviewed seed data before being effective to perform automated classification. The multi-stage clustering techniques describe herein generate "close-knit" clusters (e.g., of items and/or other content) and address the aforementioned problems by forming very tightly knit and small clusters (e.g., clusters having less than a maximum number of elements) that allows prioritization of the review queue using skip review for most elements in each cluster. For example, skip review may refer to ascribing the result of an item's compliance review to one or more other items within the same close-knit cluster as the reviewed item, due to similarity between the items (and/or claims described in association with the items) within the close-knit cluster. Accordingly, in some cases a single item from a close-knit cluster may be evaluated for compliance and the compliance label (e.g., compliance label data indicating compliance or lack of compliance) may be applied to other items within the cluster without requiring that each item be individually reviewed. Additionally, redundancies in seed data may be removed, thus reducing training and prediction time, automatically providing a regularizing effect.

Additionally, in various examples described herein, within cluster (e.g., intra-cluster) similarity is used to ensure similarity between elements in a cluster on top of the extant clustering algorithm. Intra-cluster similarity may be performed by creating a matrix and scoring each element of a cluster against remaining elements of the same cluster, or by pair-wise similarity (e.g., cosine similarity and/or Euclidean distance) between cluster elements. Outlier elements may be re-clustered in order to ensure the algorithm's accuracy and to provide better coverage.

The distinct close-knit cluster counts (e.g., the number of elements in the last clustering stage) may be rolled up to the previous clustering stage to count the number of distinct groups to prioritize. Roll-up may be performed between each clustering level, as described below. For example, a further rollup may be used to identify the workload division for each reviewer. A further rollup to the first stage of clustering may be used to identify trainings and/or resources needed for the compliance review task (or other task). The most crucial part of review operations planning may be optimization. Accordingly, the rollup operations after multistage clustering may help to identify the exact effort needed instead of providing the same number of resources for each review task. Review queue prioritization approach, if selected, may be used to reduce resource consumption by skip-reviewing close knit clusters (e.g., clusters in the most granular stage of the multi-stage clustering).

In addition, the various multi-stage classification algorithms described herein may use string similarity scores (e.g., string distance scores) to determine the most similar items. These string similarity scores may be used as a basis for auto-labeling items. Such similarity scores may be used for classifying (e.g., identifying true positives, false positives, etc.) in order to avoid reviewing a similar product that has already been or will be classified. In addition, disparity amongst other predictions and difference scores may be used to automatically classify new items, thus reducing resource consumption, while providing higher accuracy and better coverage.

Compliance teams may be responsible for determining policies and compliance strategies, by understanding the relevant guidelines and/or regulations. Compliance assessment involves identifying and restricting items (e.g., items listed on an e-commerce site by third party sellers) that are not compliant while enabling compliant items. Items that are potentially non-compliant may be subjected to some enforcement action. Accordingly, items may be labeled as non-compliant (based at least in part on the various multistage clustering techniques described herein) and may thereafter be manually reviewed to reduce inaccurate suppression. Manual classification is a labor-intensive process that involves processing and thought burden for the reviewers, and thus involves resource planning ahead of time. Additionally, item classification techniques typically attempt to solve a single defined problem. However, the types of items listed by large e-commerce services can vary in characteristics and attributes, and are thus not well-suited for off-the-shelf classification/compliance assessment techniques. Accordingly, the various systems and techniques described herein provide close-knit clusters of item listings (as determined using textual similarity) in order to simplify and reduce redundancy for manual classification.

Compliance assessment of items may use keyword classes to scope potential items as potentially non-compliant. In some cases, manual review may be used to remove false positives. In some cases, exclusionary keywords may also be specified; the presence of these keywords excludes the relevant items from identification. In various techniques described herein, a close-knit clustering (CKC) method that groups similar products in the same cluster is used. This similarity is defined using the set of text attributes that is both common among the items and which is specific to the relevant classification problem. Accordingly, the set of text attributes varies from use case to use case. Previous compliance review regimes are prone to human error as item classification is a significantly large dataset that involves a large amount of manual information processing. Depending on the size of problem/classification dataset, manual compliance classification involves planning and thorough training for a sizable workforce. Even with significant training, classification quality may be subjective and may vary from one reviewer to another, based on their respective understanding of the relevant compliance domain and/or item type. In order to build a supervised learning classification model, the solution starts with the above three problems to get the seed data (e.g., labeled training data) and to review the left out low-confidence queue.

Accordingly, in various examples described herein, the multi-stage clustering techniques provide a resource planning and review queue prioritization solution that is able to group the classification queue (e.g., the items to be classified) into similar, tightly-knit, knowledge-based groups, that enable more focused review training, low switching expense, and prioritized reviewing. The resulting labeled data may be used to make supervised learning models seed data efficient and effective, and may reduce classification error.

In various examples, the multi-stage text-based clustering techniques described herein may employ textual preprocessing to remove common words/phrases that are unrelated to the classification task. Textual preprocessing may be employed at multiple stages in the queue. For example, textual preprocessing may initially be used at a first cluster level to identify high level topics and to compute operation resources and training. The next clustering stage may be used for close knit cluster identification based on similarity in the crucial attributes. In order to identify the right small clusters, known clustering methods like hierarchical clustering, LDA, and/or K-means clustering may be used for the relevant item text. Additionally, intra-cluster similarity may be calculated and a threshold similarity score (e.g., a "similarity threshold") may be used—beyond which the datapoint may be kicked out its current cluster to find a cluster with which it is more similar. The process is iterative in nature and may terminate when user-specified parameters are met. Examples of such parameters may include maximum and minimum acceptable clusters, weighted within-cluster distance, etc.

In various examples described herein, the systems and techniques may efficiently prioritize and maintain compliance, using tuned intelligence to effectively manage resource constraints and/or emerging compliance issues. Being dynamic in nature, the systems and techniques may ensure that seed data used to train supervised classification models may be prioritized to bring in maximum benefit with minimum computational and/or manual resource.

The various techniques described herein use multi-stage clustering and group item data for compliance classification into small clusters of textually-similar data (e.g., low entropy clusters). Although the techniques described herein are described using item-compliance examples, the technology described herein may be used for other classification domains. Some prominent examples may include fake news detection, spam detection, sensitivity classification, labeling of images by clustering similar images together, etc.

Multi-stage clustering may be used in this context with to generate close-knit, highly-similar clusters at the final, most-granular level (e.g., at the final iteration of the multi-stage clustering). The most granular clusters are typically small in terms of element size and represent similar data that can directly be used for auto-labeling or review prioritization. In addition to multi-stage clustering, a spot check algorithm that ensures cluster closeness may be used. The auto-labeled data being adjacent to its similar clusters may be used for reviewing auto-labeled items and for finding any discrepancy in data that may be causing discrepancies. The auto-labels may be relied on (e.g., for taking some action and/or for seed data prioritization) according to an acceptable level of risk tolerance.

FIG. 1 is a block diagram depicting an example system 100 effective to perform multi-stage text-based clustering, according to various embodiments of the present disclosure. In various examples, one or more computing devices may be used to implement the multi-stage clustering system 102 described herein. To the extent multiple computing devices are used to implement the multi-stage clustering system 102, such computing devices may communicate with one another and/or with one or more of the other components depicted in FIG. 1 over a network 104 (e.g., a local area network (LAN) and/or a wide area network (WAN) such as the internet). In various examples, one or more of the components of multi-stage clustering system 102 may be omitted in some embodiments and/or additional components may be added. In some examples, some of the components of multi-stage clustering system 102 that are shown in FIG. 1 may be implemented by other devices or services which may be configured in communication with the multi-stage clustering system 102. In various examples, the multi-stage clustering system 102 may be configured in communication with non-transitory computer-readable memory 103 that may store instructions effective to implement the various techniques described herein.

In various examples, a bulk data set 120 (e.g., the data to be labeled) may be input into a clustering algorithm used at a first level of clustering. For example, K-means clustering may be used to find level 1 clusters C11, C12, ..., C1n. In these examples n may be a relatively small number (e.g., n<10), although any desired value for n may be selected. In some examples, the appropriate number of clusters at level 1 (e.g., the number n) may be determined using the elbow curve (e.g., by finding the "Knee"), or by using other methods such as the silhouette method, finding the maximum average silhouette, using gap statistics, etc. The first cluster split (e.g., clustering level 1) is important as it may be used in training and resource planning (e.g., to develop a training plan for reviewers that label the most granular clusters (e.g., clusters generated at clustering level 4 (or some other final iteration of multi-stage clustering)).

Clusters at each level of clustering may be arranged based on inter-cluster distance (e.g., distances between clusters may be required to be smaller than a threshold distance before the iterative clustering process terminates), and each cluster is individually further passed as input to the next level of multi-stage clustering. For example, the level 1 clusters C11, C12, ..., C1n may each be passed as input for level 2 clustering, and so on, until a satisfactory intra-cluster distance (and/or inter-cluster distance) is achieved. For example, an average maximum cluster size may be specified to determine the appropriate number of iterations (e.g., a maximum average number of elements present in each cluster). In some examples, a maximum average cluster size may be 10-20. However, any desired cluster size may be used depending on the particular implementation and/or use case. In some cases, depending on the problem, a minimum intra-cluster distance can be explored and/or set by intuition and/or on the basis of empirical testing. Additionally, the average number (e.g., 15 elements) may only be the average cluster size; however, there may be clusters with hundreds or even thousands of instances. An "instance" or "element," as used herein, refers to a single item to be labeled for compliance, a single article (or other quantum of text) to be labeled as real/fake, an email to be labeled as spam/non-spam, etc. As the number of average elements in each cluster decreases at each iteration (e.g., when moving from clustering level 1 to clustering level 4 (and potentially beyond, depending on the implementation)), the average number of clusters increases. In the example depicted in FIG. 1, each level of clustering may increase the average number of clusters by an order of magnitude (e.g., from n<10 to m~100, to o~1000, to p~10,000, etc.). These numbers are by way of example only; the exact numbers are implementation and use case specific. In various examples, the number of iterations may be determined using a maximum intra-cluster distance (e.g., the distance between any two given points of a cluster may not exceed the maximum intra-cluster distance), inter-cluster distance, maximum cluster size, etc. As known to those of ordinary skill in the art, the inter-cluster distance and intra-cluster distance calculations may vary according to the particular clustering algorithm used and/or according to the particular techniques used to calculate these distances. For example, K-means is a centroid-based algorithm that minimizes the distance between elements in a cluster and the centroid of the cluster. In Average linkage clustering, the inter-cluster distance is defined as the average of distance between all pairs of elements between the two clusters. In various examples, an inter-cluster threshold, an intra-cluster threshold, and/or a maximum average cluster size may be used to determine the appropriate number of clustering iterations to perform.

In the various embodiments described herein, clustering is used recursively to be able to find a set of robust clusters that are similar in all properties. Each data element comprises multiple attributes (e.g., informational columns in a matrix format), and variations within the data. For example, text data has a varied level of information included in the use of different words and/or word orders. Similarly, image data has different information in pixel values. Additionally, at the various different levels there can be clusters with 100 elements and there can be clusters with 1 element. Thus, the multi-stage clustering system 102 may be used for division of workload based on close knit clusters rather than items to be reviewed by each individual, providing a more accurate estimate of resources needed and balancing of work effort.

Figure 2:
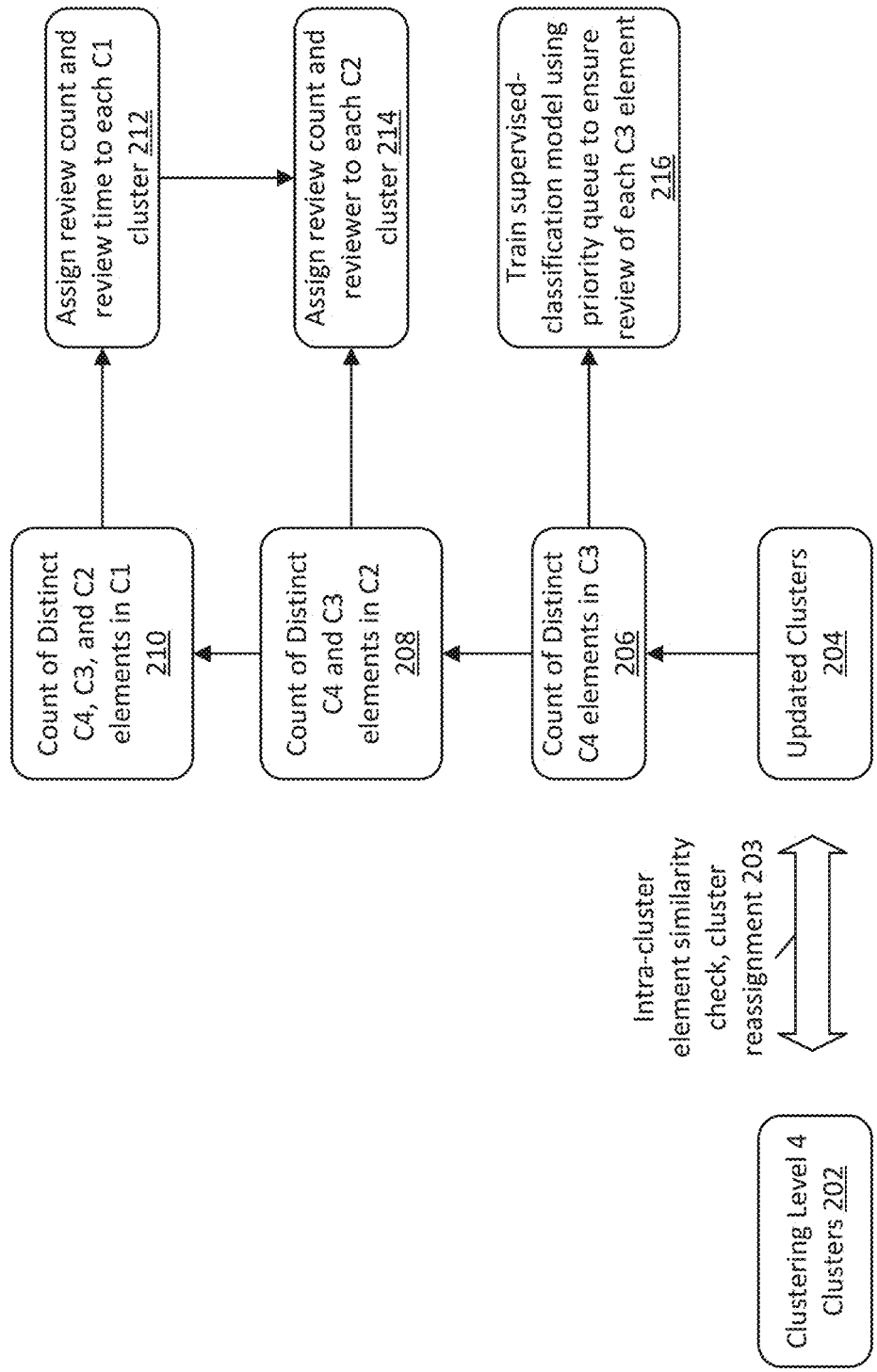
FIG. 2 is a block diagram illustrating a roll up of multi-stage clusters for resource planning and supervised machine learning model generation, in accordance with various aspects of the present disclosure.

FIG. 2 is a block diagram illustrating a roll up of multi-stage clusters for resource planning and supervised machine learning model generation, in accordance with various aspects of the present disclosure. Clustering level 4 clusters 202 are shown in FIG. 2. However, any other level of multi-stage clustering may be used. In general, these clusters may represent the most-granular clusters (e.g., clusters resulting from the final iteration of multi-stage clustering). For ease of illustration, we will refer to these clusters in reference to FIG. 2 as level 4 clusters.

An intra-cluster element similarity check may be performed in order to perform cluster reassignment 203 of elements to ensure that elements are in the most appropriate clusters (e.g., the clusters in which the element similarity is maximized). The similarity check may be performed, for example, by determining an element's similarity score (e.g., Euclidean distance, cosine similarity, etc.) with respect to each other element of the cluster and comparing the similarity score to some other threshold. After any cluster reassignment 203, updated clusters 204 may be generated.

Thereafter, a rollup operation may be performed. For example, for each C3 (e.g., a level 3 cluster one hierarchical level above the level 4 clusters) cluster, the number of distinct C4 elements in the C3 cluster may be determined at action 206. This rollup operation may be used to prioritize a queue of seed data to ensure review of each C3 element (action 216). The reviewed data may thereafter be used to train a supervised classification model.

At action 208, another rollup operation may be performed. For example, for each C2 cluster (e.g., a level 2 cluster two hierarchical levels above the level 4 clusters), the number of distinct C4 and C3 elements in each C2 cluster may be counted. This may be used for resource allocation at action 214. For example, a review count and/or a reviewer may be assigned to each C2 cluster based at least in part on the number of distinct C4 and C3 elements in each of the C2 clusters.

At action 210, another rollup operation may be performed. For example, for each C1 cluster (e.g., a level 1 cluster three hierarchical levels above the level 4 clusters), the number of distinct C4, C3, and C2 elements in each C1 cluster may be counted. This may be used for resource allocation at action 212. For example, a review count and/or a reviewer may be assigned to each C1 cluster based at least in part on the number of distinct C4, C3, and C2 elements in each of the C1 clusters. In various examples, the rollup performed at action 210 may be used to determine a number of reviewers and/or resources to be trained for review of each C1 category. Accordingly, this rollup may be used for resource forecasting and provisioning.

Figure 3:
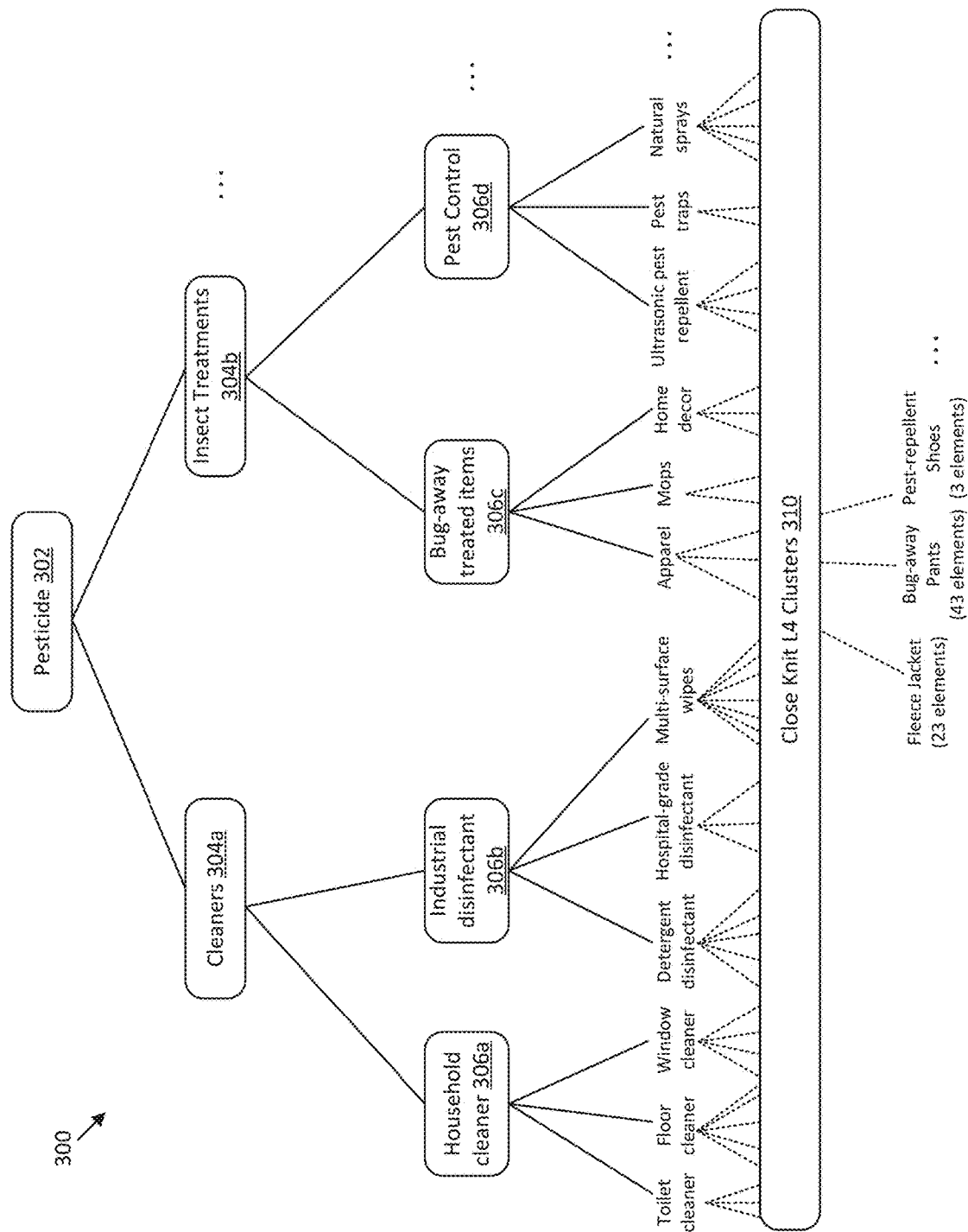
FIG. 3 depicts examples of clusters of items that may be generated using multi-stage text-based clustering, in accordance with various aspects of the present disclosure.

FIG. 3 depicts an example 300 of clusters of items that may be generated using multi-stage text-based clustering, in accordance with various aspects of the present disclosure. In the example depicted in FIG. 3, the bulk dataset may be items (e.g., elements) categorized as pesticides (pesticide 302). After a first level of clustering (e.g., using LDA, K-means clustering and/or some other clustering algorithm), the pesticide items have been subdivided into a cluster titled cleaners cluster 304a and a cluster titled insect treatments cluster 304b (among other possible clusters). Each of these clusters is subjected to another clustering algorithm (e.g., the same clustering algorithm or a different clustering algorithm, as desired) to generate a second level of clusters. Clusters may be iteratively subdivided in this manner as many times as desired (e.g., to meet a desired average cluster size and/or to reach a minimum number of clusters). In the illustrative example of FIG. 3, the second level of clusters includes the clusters titled household cleaner cluster 306a, industrial disinfectant cluster 306b, bug-away treated items cluster 306c, pest control cluster 306d, etc. Each of these second level (e.g., "level 2") clusters is further subjected to another clustering algorithm (e.g., one of the previously-used clustering algorithms at levels 1 or 2, or a different clustering algorithm, as desired) to generate clusters entitled toilet cleaner, floor cleaner, window cleaner, detergent disinfectant, hospital-grad disinfectant, multi-surface wipes, apparel, mops, home decor, ultrasonic pest repellent, pest traps, natural sprays, etc. Each of these third level (e.g., "level 3") clusters may be further subjected to another clustering algorithm (e.g., one of the previously-used clustering algorithms at levels 1-3 or a different clustering algorithm, as desired) to generate close knit L4 clusters 310. A few example L4 clusters are shown in FIG. 3 along with the corresponding number of similar elements in each of the L4 clusters. For example, the L3 cluster "Apparel" includes the L4 clusters entitled Fleece Jacket (with 23 elements), Bug-away Pants (with 43 elements), and Pest-repellent Shoes (with 3 elements), among other possible L4 clusters. In various examples, the L4 clusters may be spot checked using element similarity scoring techniques, as described above. Outlier elements may be re-clustered as desired. In various examples, the elements of the L4 clusters may be subsets of the elements of input L3 clusters.

As previously described, the various clustering algorithms may determine similarity between various elements along various attribute dimensions. For example, text data (e.g., item titles and/or description) may be preprocessed using various techniques such as lemmatization, stop word removal, tokenization, etc., to determine a set of n-gram tokens. The n-gram tokens may be embedded (e.g., using a pre-trained language model) and may be clustered according to their relative proximities in the embedding space (e.g., using a clustering algorithm). Each resulting cluster may be further iteratively clustered, as described herein. Clusters may be rolled up as described above in reference to FIG. 2 for various seed data prioritization, forecasting, and/or resource planning purposes. Additionally, in various examples, at the L4 (and/or other most-granular level of clustering) a single element may be deemed representative of all other elements in the cluster and may be used to auto-classify all other elements by applying the same classification label to all elements in the cluster (e.g., the same compliance label).

Figure 4:
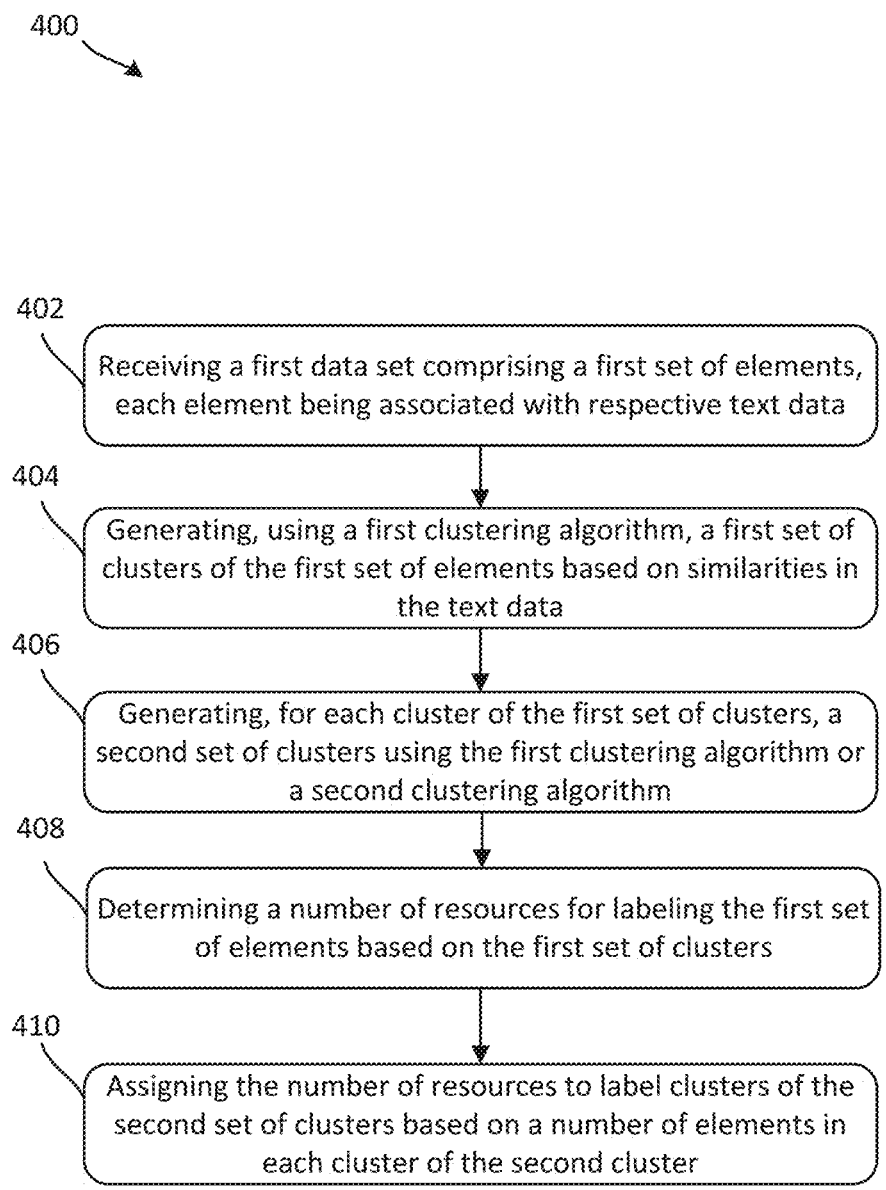
FIG. 4 depicts an example process for multi-stage text-based clustering, in accordance with various aspects of the present disclosure.

FIG. 4 depicts an example process 400 for multi-stage text-based clustering, in accordance with various aspects of the present disclosure. Those portions of FIG. 4 that have been previously discussed in reference to FIGS. 1-3 may not be described again for purposes of clarity and brevity. The actions of the process 400 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 400 of FIG. 4 may begin at action 402, at which a first data set comprising a first set of elements may be received. Each element may be associated with respective text data. For example, a catalog of items with each item being associated with text describing the item may be received. A goal may be to label the items as either compliant or non-compliant with respect to one or more rules and/or regulations. In another example, a plurality of news articles may be received, each news article comprising the text that makes up that news article. A goal may be to label the news articles as fake (e.g., fabrications that do not align with known facts) or real (e.g., verifiable, factual, and/or accurate articles).

Processing may continue at action 404, at which a first clustering algorithm may be used to generate a first set of clusters of the first set of elements based on similarities in the text data. For example, k-means clustering, k-nearest neighbors, and/or any other unsupervised clustering algorithm may be used to generate a plurality of clusters of the first set of elements based on similarity between the elements.

Processing may continue at action 406, at which a second set of clusters may be generated for each cluster of the first set of clusters using either the first clustering algorithm, or a second clustering algorithm. For example, in FIG. 3, each level 1 cluster (e.g., cleaners cluster 304a, insect treatments cluster 304b, etc.) is further subdivided using an L2 clustering technique. For example, cleaners cluster 304a is subjected to a clustering algorithm to generate household cleaner cluster 306a and industrial disinfectant cluster 306b, while insect treatments cluster 304b is subjected to a clustering algorithm to generate bug-away treated items cluster 306c and pest control cluster 306d.

Processing may continue at action 408, at which a number of resources for labeling the first set of elements may be determined based on the first set of clusters. For example, as described in reference to FIG. 2, the number of distinct elements at each hierarchical level below the L1 clustering level may be rolled up and counted for each cluster of the first level of clusters. This number may be used, for each cluster, to provision resources for that cluster. For example, this may be used to determine the number of compute resources and/or personnel that need to be provisioned and/or trained for labeling of the particular cluster.

Processing may continue at action 410, at which the number of resources may be assigned to label clusters of the second set of clusters based on a number of elements in each cluster of the second cluster. For example, as described in reference to FIG. 2, the number of distinct elements at each hierarchical level below the L2 clustering level may be rolled up and counted for each cluster of the second level of clusters. This number may be used, for each L2 cluster, to assign a review count (e.g., a number of elements to be reviewed) and/or to assign a number of reviewers (e.g., computing devices, nodes, and/or personnel) to each L2 cluster. Although not shown in FIG. 4, additional stages of multi-stage clustering may be performed until the desired average cluster size is met.

Figure 5:
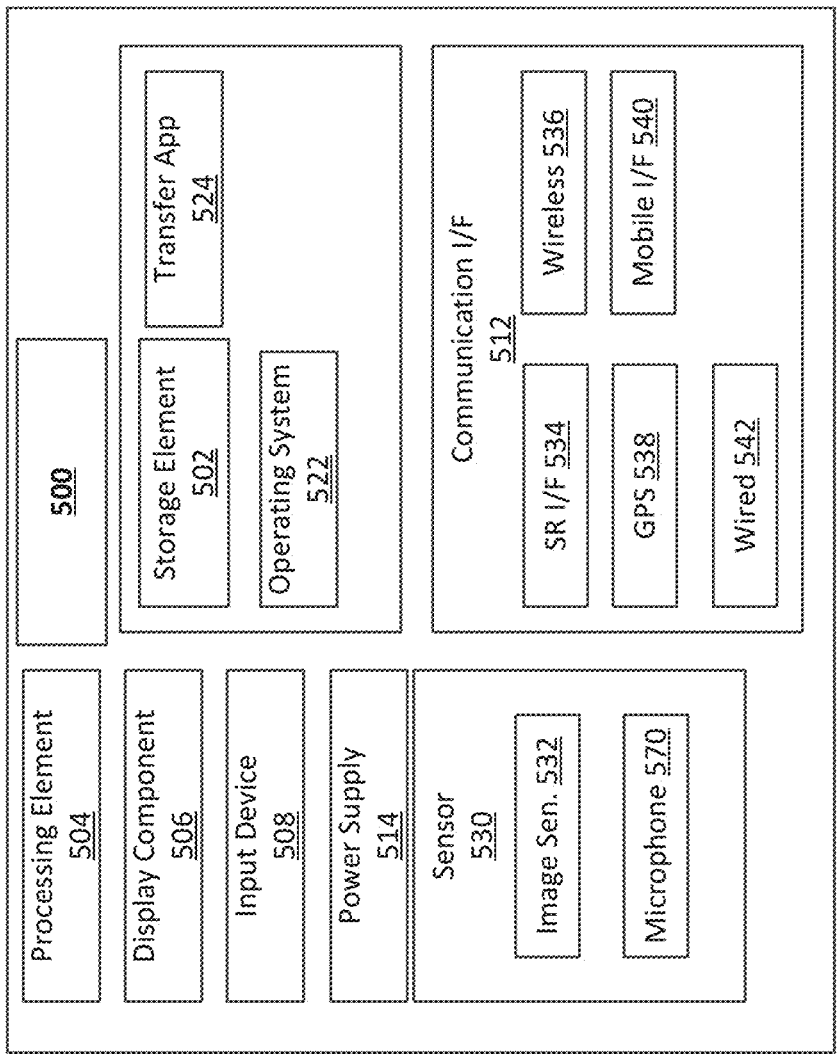
FIG. 5 is a block diagram showing an example architecture of a computing device that may be used in accordance with various aspects of the present disclosure.

FIG. 5 is a block diagram showing an example architecture 500 of a computing device that may be used to perform multi-stage clustering, in accordance with various aspects of the present disclosure. It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store parameters, and/or machine learning models used for the various techniques described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display the various fields and/or GUIs described herein.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information.

As noted above, multiple devices may be employed in a single system. In such a multi-device system, each of the devices may include different components for performing different aspects of the system's processing. The multiple devices may include overlapping components. The components of the computing devices, as described herein, are exemplary, and may be located as a stand-alone device or may be included, in whole or in part, as a component of a larger device or system.

Figure 6:
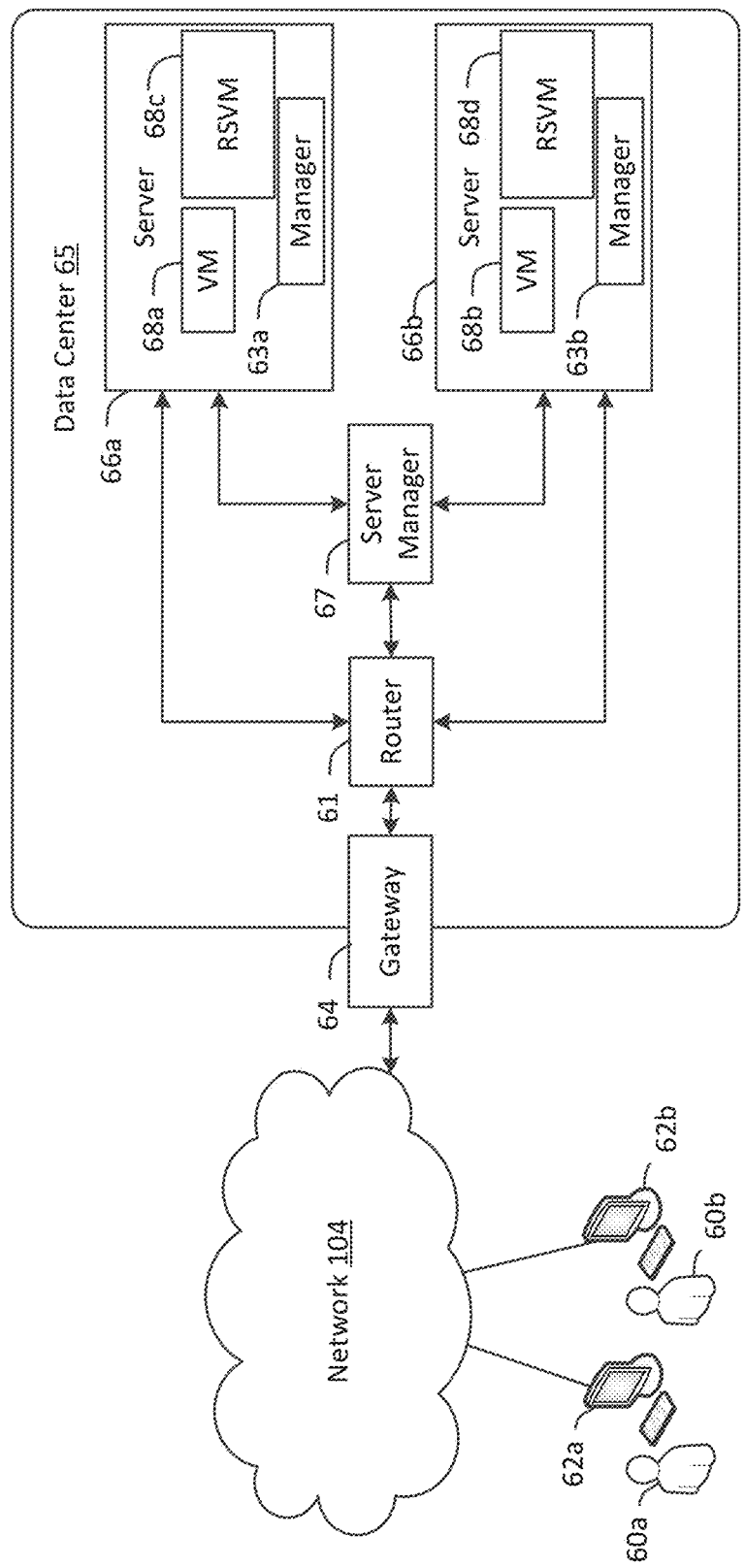
FIG. 6 is a diagram illustrating an example system for sending and providing data that may be used in accordance with the present disclosure.

An example system for sending and providing data will now be described in detail. In particular, FIG. 6 illustrates an example computing environment in which the embodiments described herein may be implemented. For example, the computing environment of FIG. 6 may be used to provide the various techniques to perform multi-stage clustering described herein as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various machine learning techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large-scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed, at least in part, to direct various communications to, from, and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

Although various systems described herein may be embodied in software or code executed by general-purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of multi-stage clustering, comprising:
    receiving a data set comprising a first plurality of elements, where each element of the first plurality of elements includes respective text describing the element;
    dividing the first plurality of elements into a first plurality of clusters at a first hierarchical level using a clustering algorithm;
    dividing each of the first plurality of clusters into a second plurality of clusters at a second hierarchical level using the clustering algorithm;
    dividing each of the second plurality of clusters into a third plurality of clusters at a third hierarchical level using the clustering algorithm;
    dividing each of the third plurality of clusters into a fourth plurality of clusters at a fourth hierarchical level using the clustering algorithm;
    determining resource data representing a number of resources for labeling the first plurality of elements based at least in part on the first plurality of clusters at the first hierarchical level;
    assigning the number of resources to label clusters of the second plurality of clusters at the second hierarchical level based on a number of the fourth plurality of clusters in each cluster of the second plurality of clusters;
    assigning, for a first cluster of the fourth plurality of clusters, a label that classifies elements of the first cluster as belonging to a first class; and
    determining that the elements of the first cluster are non-compliant with respect to a first policy based at least in part on the label.

2. The method of claim 1, further comprising processing the respective text for each element of the first plurality of elements by:
    removing stop words from the respective text;
    performing lemmatization on the respective text; and
    tokenizing the respective text.

3. The method of claim 1, further comprising:
    for the first cluster of the fourth plurality of clusters, determining a pair-wise similarity between a first element and each other element of the first cluster; and
    determining that the pair-wise similarity between the first element and each other element of the first cluster exceeds a similarity threshold.

4. A computer-implemented method for receiving a first set of data and allocating resources for labeling the first set of data, the method comprising:
    receiving the first set of data set comprising a first set of elements, wherein each element of the first set of elements comprises text data;
    generating, using at least one clustering algorithm, a first set of clusters of the first set of elements based at least in part on similarities in the text data;
    generating, for each cluster of the first set of clusters, a second set of clusters using the at least one clustering algorithm, wherein elements of clusters of the second set of clusters are more similar to one another relative to elements of clusters of the first set of clusters;
    determining at least one of an inter-cluster threshold or an intra-cluster threshold;
    generating a resulting set of clusters by iteratively clustering the second set of clusters using the at least one clustering algorithm until at least one of the inter-cluster threshold or the intra-cluster threshold is satisfied, wherein elements of clusters of the resulting set of clusters are more similar to one another relative to elements of clusters of the second set of clusters;
    determining resource data representing a number of resources for labeling the first set of elements based at least in part on the first set of clusters; and
    assigning the number of resources to label clusters of the resulting set of clusters based at least in part on a number of clusters of the resulting set of clusters in each of the second set of clusters.

5. The method of claim 4, wherein iteratively clustering the second set of clusters further comprises:
    generating, for each cluster of the second set of clusters, a third set of clusters using the at least one clustering algorithm;
    generating, for each cluster of the third set of clusters, a fourth set of clusters using the at least one clustering algorithm; and labeling each element of a first cluster of the fourth set of clusters with first label data indicating compliance of each element of the first cluster.

6. The method of claim 5, further comprising:
determining, for a first element of the first cluster of the fourth set of clusters, a similarity between the first element and other elements of the first cluster;
determining that the similarity is greater than or equal to a similarity threshold; and
labeling each element of the first cluster of the fourth set of clusters with the first label data based at least in part on the similarity being greater than or equal to the similarity threshold.

7. The method of claim 5, further comprising:
determining a first number of clusters of the fourth set of clusters included in a first cluster of the first set of clusters;
determining a number of elements in the first number of clusters of the fourth set of clusters; and
determining the number of resources further based at least in part on the number of elements in the first number of clusters of the fourth set of clusters.

8. The method of claim 5, further comprising:
determining a first number of clusters of the fourth set of clusters included in a first cluster of the third set of clusters;
determining a number of elements in the first number of clusters of the fourth set of clusters; and
training a supervised machine learning model based at least in part on the number of elements in the first number of clusters of the fourth set of clusters.

9. The method of claim 5, further comprising:
determining, for a first element of the first cluster of the fourth set of clusters, a similarity between the first element and other elements of the first cluster;
determining that the similarity is less than a similarity threshold; and
determining, using the at least one clustering algorithm, a second cluster of the fourth set of clusters for the first element based at least in part on the similarity being less than the similarity threshold.

10. The method of claim 4, further comprising:
determining a minimum number of clusters;
determining that the second set of clusters includes a number of clusters that is less than the minimum number of clusters; and
iteratively subdividing clusters of the first set of elements using the at least one clustering algorithm until the minimum number of clusters is reached.

11. The method of claim 4, further comprising:
removing stop words from the text data;
performing lemmatization on the text data; and
tokenizing the text data to generate a plurality of tokens, wherein the similarities in the text data are determined based at least in part on similarity among the plurality of tokens.

12. The method of claim 4, wherein a first resource of the number of resources is assigned to label a subset of clusters based at least in part on a similarity between text data of elements of the subset of clusters.

13. A system comprising:
at least one processor; and
non-transitory computer-readable memory storing instructions that, when executed by the at least one processor, are effective to:
 receive a first data set comprising a first set of elements, wherein each element of the first set of elements comprises text data;
 generate, using at least one clustering algorithm, a first set of clusters of the first set of elements based at least in part on similarities in the text data;
 generate, for each cluster of the first set of clusters, a second set of clusters using the at least one clustering algorithm, wherein elements of clusters of the second set of clusters are more similar to one another relative to elements of clusters of the first set of clusters;
 determine at least one of an inter-cluster threshold or an intra-cluster threshold;
 generate a resulting set of clusters by iteratively cluster the second set of clusters using the at least one clustering algorithm until at least one of the inter-cluster threshold or the intra-cluster threshold is satisfied, wherein elements of clusters of the resulting set of clusters are more similar to one another relative to elements of clusters of the second set of clusters;
 determine a number of resources for labeling the first set of elements based at least in part on the first set of clusters; and
 assign the number of resources to label clusters of the resulting set of clusters based at least in part on a number of clusters of the resulting set of clusters in each of the second set of clusters.

14. The system of claim 13, the non-transitory computer-readable memory storing further instructions that, when executed by the at least one processor, are further effective to:
generate, for each cluster of the second set of clusters, a third set of clusters using the at least one clustering algorithm;
generate, for each cluster of the third set of clusters, a fourth set of clusters using the at least one clustering algorithm; and
label each element of a first cluster of the fourth set of clusters with first label data indicating compliance of each element of the first cluster.

15. The system of claim 14, the non-transitory computer-readable memory storing further instructions that, when executed by the at least one processor, are further effective to:
determine, for a first element of the first cluster of the fourth set of clusters, a similarity between the first element and other elements of the first cluster;
determine that the similarity is greater than or equal to a similarity threshold; and
label each element of the first cluster of the fourth set of clusters with the first label data based at least in part on the similarity being greater than or equal to the similarity threshold.

16. The system of claim 14, the non-transitory computer-readable memory storing further instructions that, when executed by the at least one processor, are further effective to:
determine a first number of clusters of the fourth set of clusters included in a first cluster of the first set of clusters;
determine a number of elements in the first number of clusters of the fourth set of clusters; and
determine the number of resources further based at least in part on the number of elements in the first number of clusters of the fourth set of clusters.

17. The system of claim 14, the non-transitory computer-readable memory storing further instructions that, when executed by the at least one processor, are further effective to:
- determine a first number of clusters of the fourth set of clusters included in a first cluster of the third set of clusters;
- determine a number of elements in the first number of clusters of the fourth set of clusters; and
- train a supervised machine learning model based at least in part on the number of elements in the first number of clusters of the fourth set of clusters.

18. The system of claim 14, the non-transitory computer-readable memory storing further instructions that, when executed by the at least one processor, are further effective to:
- determine, for a first element of the first cluster of the fourth set of clusters, a similarity between the first element and other elements of the first cluster;
- determine that the similarity is less than a similarity threshold; and
- determine, using the at least one clustering algorithm, a second cluster of the fourth set of clusters for the first element based at least in part on the similarity being less than the similarity threshold.

19. The system of claim 13, the non-transitory computer-readable memory storing further instructions that, when executed by the at least one processor, are further effective to:
- determine a minimum number of clusters;
- determine that the second set of clusters includes a number of clusters that is less than the minimum number of clusters; and
- iteratively subdivide clusters of the first set of elements using the at least one clustering algorithm until the minimum number of clusters is reached.

20. The system of claim 13, the non-transitory computer-readable memory storing further instructions that, when executed by the at least one processor, are further effective to:
- remove stop words from the text data;
- perform lemmatization on the text data; and
- tokenize the text data to generate a plurality of tokens, wherein the similarities in the text data are determined based at least in part on similarity among the plurality of tokens.

* * * * *